(12) United States Patent
Fuller et al.

(10) Patent No.: US 6,700,304 B1
(45) Date of Patent: Mar. 2, 2004

(54) ACTIVE/PASSIVE DISTRIBUTED ABSORBER FOR VIBRATION AND SOUND RADIATION CONTROL

(75) Inventors: Christopher R. Fuller, Virginia Beach, VA (US); Pierre E. Cambou, Champagne (FR)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 09/294,398

(22) Filed: Apr. 20, 1999

(51) Int. Cl.[7] .................... H01L 41/08; A61F 11/06
(52) U.S. Cl. ............... 310/321; 310/328; 310/800; 310/326; 381/71.2; 181/208
(58) Field of Search ............. 310/316.01, 321, 310/322, 324, 328, 330–332, 366, 800; 381/94, 152, 158, 190, 71, 71.2; 181/206, 207–209, 294–296

(56) References Cited

U.S. PATENT DOCUMENTS

| | | | | |
|---|---|---|---|---|
| 3,816,774 A | * | 6/1974 | Ohnuki et al. ............... 310/334 |
| 4,028,566 A | * | 6/1977 | Franssen et al. ........ 310/800 X |
| 4,056,742 A | * | 11/1977 | Tibbetts .................. 310/800 X |
| 4,565,940 A | * | 1/1986 | Hubbard, Jr. ................ 310/326 |
| 4,849,668 A | * | 7/1989 | Crawley et al. ............. 310/328 |
| 5,485,053 A | * | 1/1996 | Baz ............................ 310/326 |
| 5,660,624 A | * | 8/1997 | Dry ............................ 106/677 |
| 5,719,945 A | * | 2/1998 | Fuller et al. ................ 381/71.2 |
| 6,191,519 B1 | * | 2/2001 | Nye et al. .............. 310/316.01 |
| 6,411,015 B1 | * | 6/2002 | Toda ........................... 310/334 |

* cited by examiner

Primary Examiner—Mark O. Budd
(74) Attorney, Agent, or Firm—Whitham, Curtis & Christofferson, P.C.

(57) ABSTRACT

The active/passive absorber for extended vibration and sound radiation control includes principally two layers. The first layer has a low stiffness per unit area which allows motion in the direction perpendicular to its main plane. The second layer is principally a mass layer. These two combined layers have a frequency of resonance close to one of the main structure. The dynamic behavior of the coupled system makes the active/passive absorber a passive absorbe; however, the first layer can be electrically actuated to induce motion in the direction perpendicular to its main plane. This addition property induces and/or changes the motion of the mass layer and therefore improves the dynamic properties of the active/passive absorber system.

31 Claims, 18 Drawing Sheets

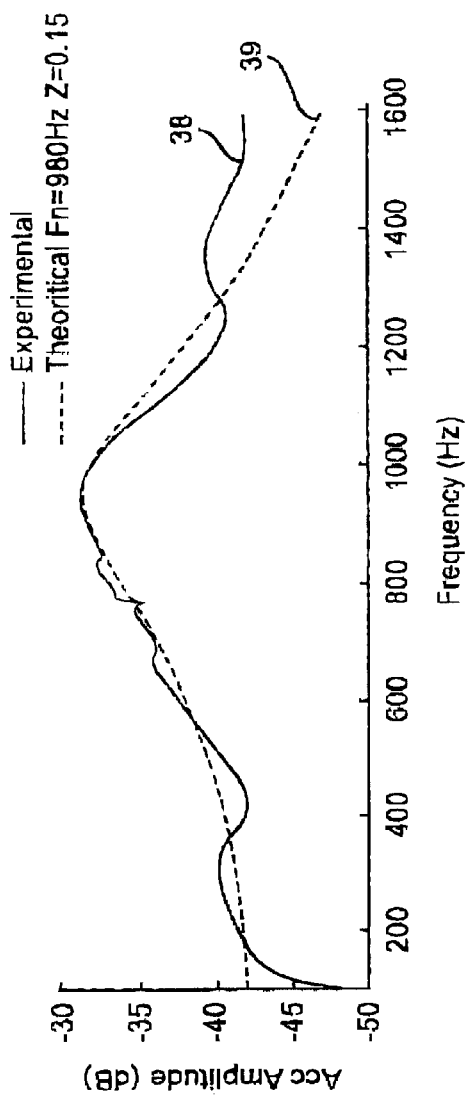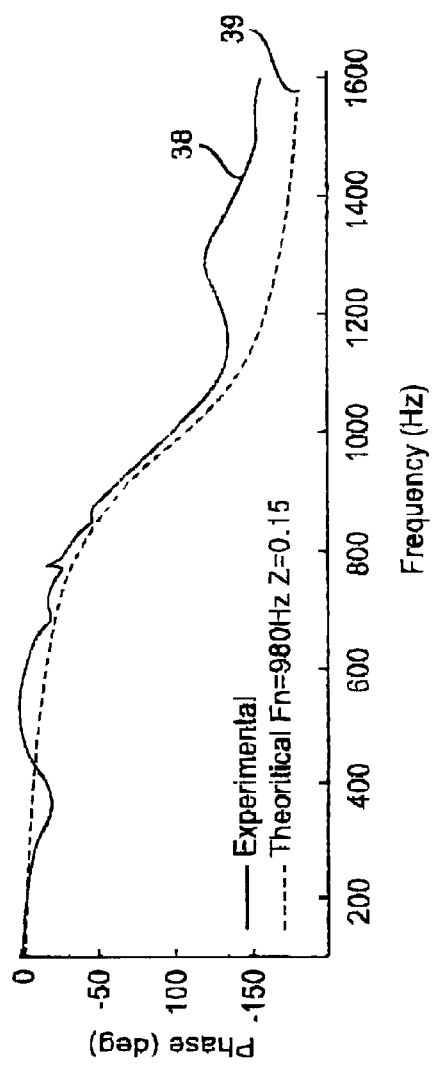
Figure 12A
Figure 12B

ACTIVE/PASSIVE DISTRIBUTED ABSORBER FOR VIBRATION AND SOUND RADIATION CONTROL

BACKGROUND OF THE INVENTION

1. Field of the Invention

The present invention generally relates to a tunable vibration absorber and, more particularly, to an active/passive tunable distributed vibration absorber for controlling vibration and sound radiation.

2. Background Description

Active and passive noise reduction control techniques are widely known and commonly used to reduce and/or control vibrations and accompanying sound radiation in vibrating bodies, such as aircraft and the like. In many instances active noise reduction techniques adequately reduce vibrations and noise, but at the cost of expensive and complex control systems. Similarly, passive noise reduction techniques also have been known to reduce vibrations and noise, but these passive systems are typically bulky and heavy and are not effective over low vibration frequencies.

Basically, active vibration control systems use a sensor which detects vibration or noise from a vibrating body. The sensor converts the vibration or noise into a signal and then inverts and amplifies the signal. The inverted signal is then fed back to an actuator (or loudspeaker) which provides the inverted signal to the vibrating body thus reducing the vibration or noise. Active control systems are typically effective at lower frequencies such as below 500 Hz.

In order to properly take advantage of active control systems, the selection of proper sensors and actuators are critical to the functionality of the active control systems. That is, if an improper sensor or actuator is chosen, the active control system will not properly invert and amplify the signal, and will thus not adequately reduce the vibration and noise of the vibrating body. It is also critical to the functioning of the active vibration control system to properly position the sensor and the actuator on the vibrating body with respect to one another, as well as with respect to the vibrations associated with the vibrating structure. For example, if the sensor and the actuator are not positioned properly, the inverted signal may not be properly amplified in order to cancel the vibration on the vibrating body. Also, it is very important to have a correct feedback circuit with is capable of inverting the signal since such a circuit determines the effectiveness of the vibration control and its frequency range.

In contrast to active control systems, passive damping systems usually are much less complex and costly. However, such damping systems are bulky and are generally only effective at higher frequencies of greater than 500 Hz. It is at these greater frequencies that the dimensions of the passive damping systems are comparable with the wavelength of the vibration of the vibrating body.

It is also common in the practice of vibration control systems to combine active and passive vibration systems. However, such hybrid active/passive dynamic vibration control systems provide improved attenuation over that achieved by the passive system at the expense of the energy added to the system via the control force.

Point tuned vibration absorbers are another method of damping the vibration of a vibrating body. However, a point absorber only controls one frequency at one point and is thus limited in its function to control vibrations over a large area of the vibrating body.

SUMMARY OF THE INVENTION

According to the invention, there is provided a distributed active vibration absorber having multi layer having multiple resonances layers. In one of the embodiments, the first layer is an active elastic layer, preferably having a low stiffness per unit area. The second layer is a mass layer, and is adhered to an uppermost top portion of each waved portion of the active elastic layer.

The active elastic layer has a low stiffness which allows motion in the direction perpendicular to its main plane. The active elastic layer can also be electrically actuated to induce motion in the direction perpendicular to its main plane. This addition property permits to induce and/or change the motion of the mass layer and therefore improve the dynamic properties of the whole system. These two combined layers have may have any frequency of resonance depending on the main structure and the stiffness, and preferably a frequency of resonance close to one of the main structure.

The active elastic layer is preferably a curved polyvinylidene fluoride (PVDF) layer; however, it may equally be a piezoelectric ceramic, a PZT rubber, an electro mechanical device and the like. The active elastic layer includes electrodes on the surfaces thereof so that the active elastic layer may be electrically activated when a voltage is applied between the first and second electrodes. This electrical activation creates an electric field. It is further contemplated that the active elastic layer is a piezoelectric material which mechanically shrinks and expands under an influence of the electric field. To this end, a distance between two planes on opposing sides of the mass layer changes when the active elastic layer mechanically shrinks and expands under the influence of the electric field.

It is preferable that the mass layer weighs no more than approximately 10% of an overall mass of the vibrating structure, and the thickness of the mass layer is proportional to a weight per unit area of the vibrating structure. However, the mass layer may be more than 10% of the overall mass of the vibrating structure. It is further contemplated by the present invention to have a mass layer which is larger in areas where the vibrating structure has modal contributions of a large amplitude compared to where the vibrating structure has modal contributions of a smaller amplitude.

The mass layer may also have a constant mass with a constant thickness or a constant mass with a varying thickness according to modal contributions of the vibrating body. It is preferable that the mass layer matches locally varying response properties of the vibrating structure, especially when the thickness of the mass layer varies.

In further embodiments, the active elastic layer includes sheets of plastic adhered to each side so as to prevent axial motion of the active elastic layer.

Accordingly, the DAVA can be tuned mechanically and electrically to reduce unwanted vibration and/or sound. The first layer is made of active material with low stiffness and allows the motion of a second layer made of a dense material. The layers, which may be multiple layers with multiple resonance frequencies, are designed to modify globally the repartition of the kinetic energy. Moreover, the DAVA of the present invention controls the vibration over an entire or a large area of the vibrating structure over multiple frequencies, and can be electrically activated.

BRIEF DESCRIPTION OF THE DRAWINGS

The foregoing and other objects, aspects and advantages will be better understood from the following detailed description of a preferred embodiment of the invention with reference to the drawings, in which:

FIGS. 12a and 12b show the frequency response of a mass layer in respect to the active input of FIG. 11;

DETAILED DESCRIPTION OF A PREFERRED EMBODIMENT OF THE INVENTION

The distributed active vibration absorber (DAVA) of the present invention is preferably limited to the mass that can be used to damp a structure under vibration. Typically, the DAVA of the present invention does not weigh more than 10% of the overall mass of the structure; however, in applications the DAVA may weigh more than 10% of the overall mass of the structure. For the area with the most motion and therefore with potentially large modal contributions, the mass of the DAVA is expected to be larger compared to an area with small motions. Also, the efficiency of the DAVA is larger if the local resonance of the distributed absorber in this area is close to the excitation frequency of the disturbance. For the other areas, the resonance frequency might be higher than this excitation. Locally, the DAVA has approximately the same resonance frequency as a known point absorber such that the mass allocated locally is a fraction of the total mass and for this reason the local stiffness is a fraction of the global stiffness. The DAVA of the present invention is a distributed system which controls the vibration over the entire or large area of the vibrating structure over multiple frequencies, and can be electrically activated.

Figure 1:
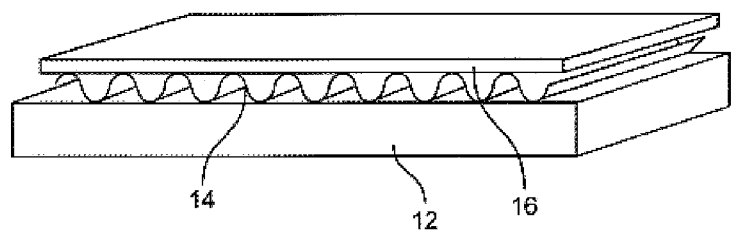
FIG. 1 shows a schematic of a distributed active vibration absorber (DAVA) of a first embodiment of the present invention.

FIG. 1 shows a schematic of a distributed active vibration absorber (DAVA) of a first embodiment of the present invention. In the preferred embodiment, the design of the present invention follows a two layer design. The first layer 14 is an active elastic layer with low stiffness per area that can be electrically activated, and is preferably polyvinylidene fluoride (PVDF) having a thickness of 10 $\mu$m. The first layer 14 may also be a piezoelectric ceramic, a PZT rubber, an electro mechanical device and the like.

An active elastic layer 14 will be used hereinafter throughout the specification for illustrative purposes. However, it is well understood that any of the above-referenced materials and other materials or multiple layers of materials well known in the art of vibration control may be equally implemented with the present invention. Moreover, for clarity purposes, like numerals will be used for like elements throughout the remaining portions of the specification.

Still referring to FIG. 1, the active elastic layer 14 is curved (e.g., waved surface) to increase the amplitude of motion and decrease the stiffness of the system. In the embodiments of the present invention, the active elastic layer 14 is lightweight and resistant to bending, and preferably has the same design characteristics as corrugated cardboard. The second layer 16 is a distributed mass layer (e.g, absorber layer) which may have a constant thickness and may be comprised of a thin sheet of lead. It is well understood, however, that the mass distribution of the mass layer 16 may include varying masses within the mass layer 16 along the entire or large area of the structure 12, and other appropriate thin sheet material, such as, steel, aluminum composite fiberglass material and the like may be used when practicing the present invention. In the embodiments using the varying mass distribution, the varying mass distribution will alter the local properties of the DAVA to ideally match the locally varying response properties of the base structure. It is also well understood that the DAVA is not limited to a two layer system of an active elastic layer and a mass layer, but may be a multiple layered system using the inventive concepts described herein, for example, a three or more layered system having at least one active elastic layer and at least one mass layer.

The mass layer 16 is designed to weigh 10% of the structure 12, and the thickness of the mass layer 16 depends directly on the weight per unit area of the structure 12. For example, for a steel beam or plate, the maximum thickness of a uniform lead layer can be easily calculated, neglecting the weight of the active elastic layer 14 as follows:

$$h_m/h_p = (\rho_b/\rho_m)*10\% = 78000/11300*10\% = 7\%$$

Thus, for a steel beam of 6.35 mm, the maximum thickness of the mass layer 16 of the DAVA of the present invention is 0.44 mm. This is assuming that the DAVA covers the entire or large area of the surface of the structure 12 (e.g., beam). With this weight limitation, the active elastic layer 14, such as the curved PVDF layer, should be provided with a very low stiffness. This is especially true for the control of low frequencies. For example, with a 1 mm thick mass layer 16 (made of lead), the stiffness of a 2 mm thick active elastic layer 14 is 9e+5 N/m in order to obtain a design resonance frequency at 1000 Hz. However, as previously discussed, the DAVA is capable of controlling the vibration over the entire or large area of the vibrating structure over multiple frequencies.

As briefly discussed above, it is well understood that further embodiments of the present invention may include multiple layers of active elastic layers 14 and mass layers 16. By way of example, at least two active elastic layers 14 may be alternately stacked with at least two mass layers 16. In the further embodiments, each active elastic layer 14 may tuned separately and each mass layers 16 may have a different mass in order to control different frequencies of the vibrating structure. Of course, the embodiments of the present invention are not limited to the above illustrative example, and may equally include more or less active elastic layers 14 (tuned to control different frequencies) and include more or less mass layers 16 (having different masses).

Figure 2:
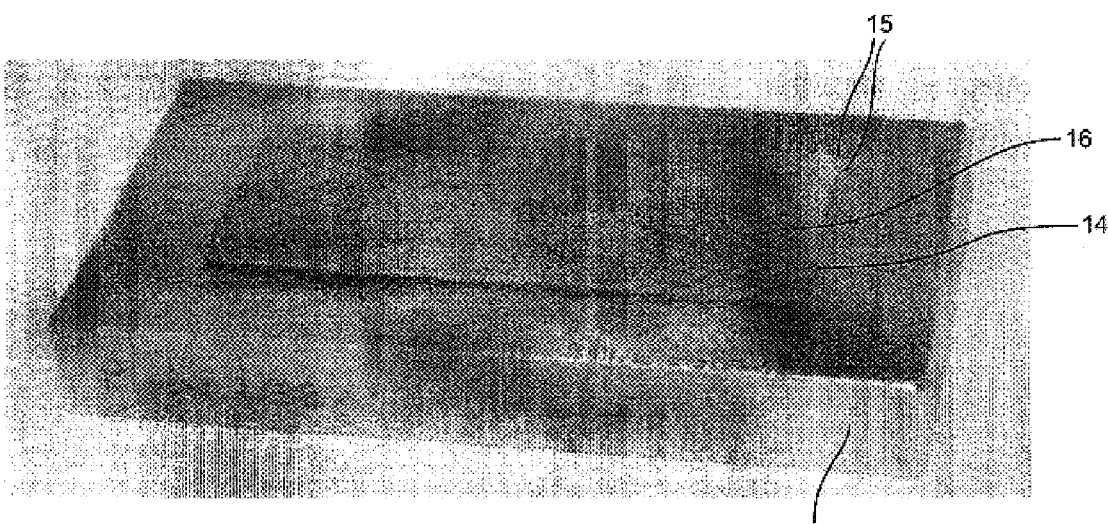
FIG. 2 shows the design of the DAVA of the first embodiment of the present invention.

FIG. 2 shows the design of the DAVA of the first embodiment of the present invention. Specifically, a corrugated piece of plastic 14 (e.g., active elastic layer) is glued together with a thin sheet of lead (e.g., mass layer 16). On each side of the active elastic layer 14 are two thin layers of silver which act as electrodes 15. When a voltage is applied between these electrodes 15, an electric field is created within the active elastic layer 14. The active elastic layer 14 is preferably a piezoelectric material which mechanically shrinks and expands under the influence of an electric field.

Figure 3:
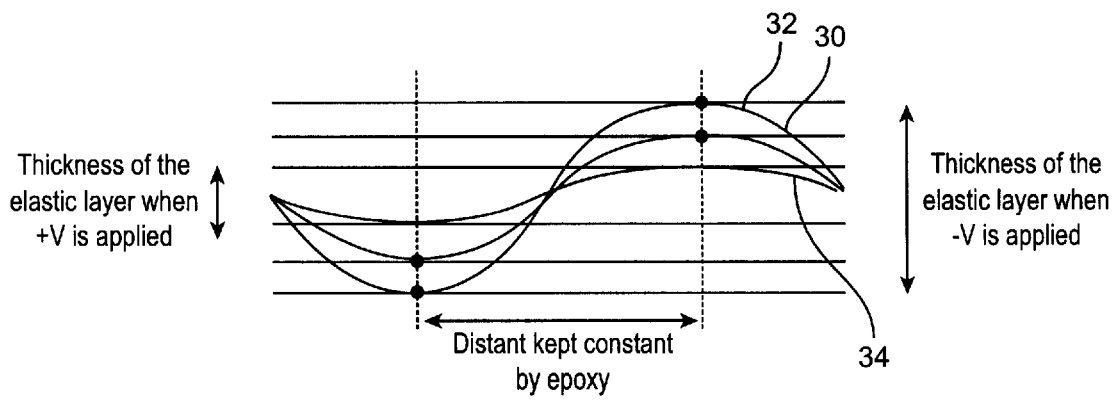
FIG. 3 shows the motion of the active elastic layer of the DAVA under electrical excitation.

FIG. 3 shows the motion of the active elastic layer 14 under electrical excitation. FIG. 3 may alternatively represent points where the active elastic layer 14 is glued with epoxy on two thin sheets of plastic 18 and where it contacts the structure 12 and mass layer 16. The two sheets of plastic 18 on both sides of the active elastic layer 14 prevent any axial motion.

Referring still to FIG. 3, line 30 represents the active elastic layer 14 at rest and line 32 represents the active elastic layer 14 when −V is applied. Furthermore, line 34 represents the active elastic layer 14 when +V is applied. As seen clearly from FIG. 3, the length of the active elastic layer 14 changes when a voltage is applied to the active elastic layer 14, and as a consequence the distance changes between the two planes on each side of the mass layer 16. The design of the DAVA transforms the in-plane motion of the active elastic layer 14 into the out-of-plane motion of the active elastic layer 14. FIG. 3 exaggerates the manner in which the shape of the active elastic layer 14 might bend under different stress configurations and, in fact, the motions of the active elastic layer 14 are small and are thus assumed linear. The validation of linearity is described in detail below.

Figure 4:
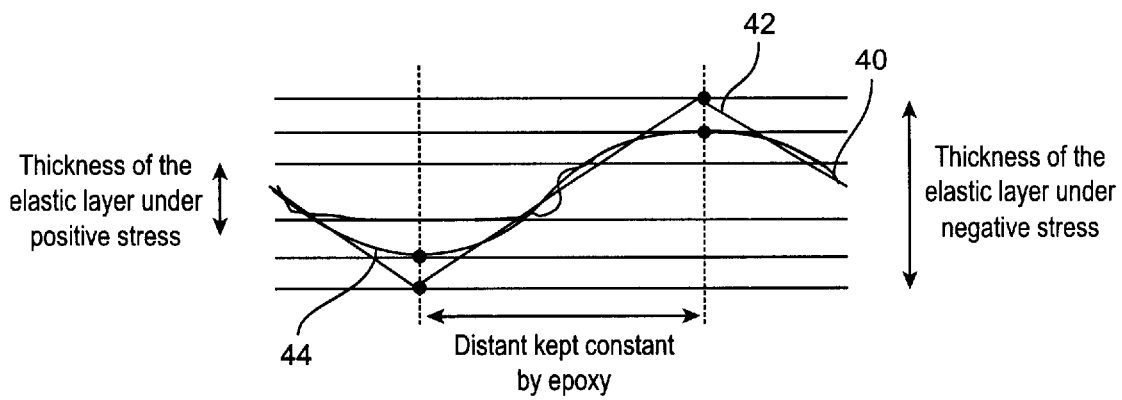
FIG. 4 shows the motion of an active elastic layer of the DAVA under mechanical excitation.

FIG. 4 shows the motion of the active elastic layer 14 under+mechanical excitation. Specifically, line 40 represents the active elastic layer 14 at rest and line 42 represents the active elastic layer 14 when a negative load is applied thereto. Furthermore, line 44 represents the active elastic layer 14 when a positive load is applied thereto. When the DAVA is constrained by mechanical forces, the length of the active elastic layer 14 does not change; however, the shape of the active elastic layer 14 is modified. It is noted that the bending stiffness of the mass layer 16 is not taken into account in the simulation since the shear of the mass layer 16 is neglected.

It is of import to note that the stiffness per unit area is low; however, the stiffness of the entire DAVA distributed over an extended area of the vibrating structure is high. It is also important to note that the stiffness (and mass) and thus resonant frequency of the DAVA may be adjusted depending on the particular application of the DAVA; however, the bending stiffness depends on the spatial wavelength and amplitude of the corrugated part of the active elastic layer 14 such that a larger wavelength reduces the bending stiffness in the normal direction. It is further noted that the bending stiffness of the DAVA in the perpendicular direction is extremely high and is preferably similar to a honeycomb structure. Moreover, the transversal stiffness of the DAVA is locally small, and globally the DAVA has the same stiffness as a point absorber with similar mass. Thus, the DAVA is globally very resistant to crushing although an individual sheet of the active elastic layer 14 is very flexible.

The transversal stiffness and thus the resonant frequency of the active elastic layer 14 can be adjusted by:
  The height of the active elastic layer 14
  The wavelength of the corrugated active elastic layer 14
  The thickness of the active elastic layer 14
  The electric shunt between the electrodes of the active elastic layer 14

Specifically, increasing the thickness of the active elastic layer 14 reduces the transversal stiffness of the DAVA. In order to have a device conformal to the extended area of the vibrating structure (as is in the present invention), this thickness cannot be increased very much. The second parameter that can be modified is the wavelength of the active elastic layer 14 such that a larger wavelength decreases the transversal stiffness of the active elastic layer 14. This parameter change is also limited since the wavelength should stay small in comparison to the wavelength of the disturbance, otherwise the DAVA may loose its distributed properties.

The thickness of the active elastic layer 14 is another parameter that can be adjusted in order to affect the stiffness of the DAVA. For example, a thinner active elastic layer 14 will lower the stiffness of the active elastic layer 14. The last solution to modify the transversal stiffness of the active elastic layer 14 is to use the piezoelectric properties of the active elastic layer 14. For example, electric shunts can provide slight changes in stiffness of the active elastic layer 14. Thus, when an active input is provided to the active elastic layer 14, the active elastic layer 14 can be controlled to behave as if its mechanical stiffness was smaller or larger.

Figure 5:
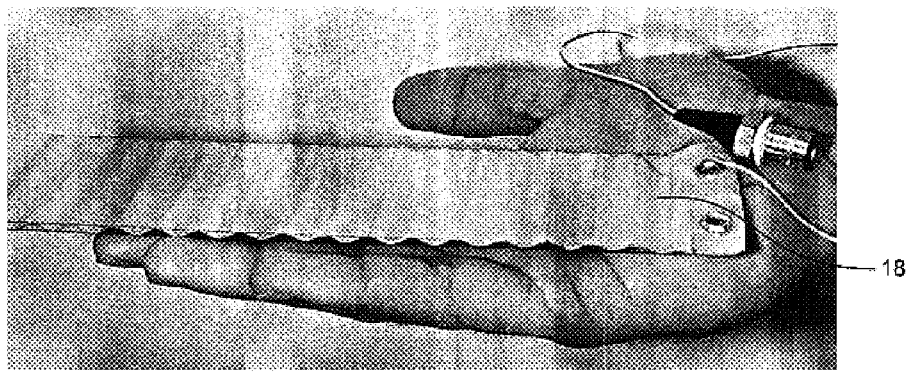
FIG. 5 shows the active elastic layer with electrical wiring connections.

FIG. 5 shows the active elastic layer with electrical wiring connections. The silver-like active elastic layer 14, preferably PVDF, can be seen through the transparent plastic sheets 18 positioned on each side of the active elastic layer 14.

Figure 6:
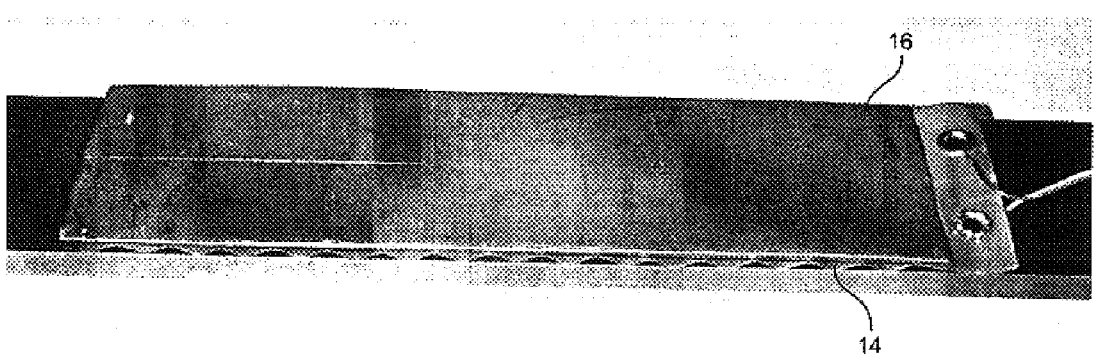
FIG. 6 shows the design of the DAVA of a second embodiment of the resent invention.

FIG. 6 shows the design of the DAVA of a second embodiment of the present invention. In this embodiment, the active elastic layer 14 is corrugated and sandwiched between the beam (e.g., structure 12) and the mass layer 16. The DAVA of this embodiment is 2" wide and is glued onto the beam 12. The mass layer 16 is constant and preferably comprises at least one lead sheet. The DAVA of this embodiment is not thick compared to the beam 12.

Manufacturing Process of the DAVA

FIGS. 7–10 represent the steps of manufacturing the DAVA of the first and second embodiments of the present invention. The main manufacturing fabrication represents the construction of the active elastic layer 14. The first step in manufacturing the active elastic layer 14 is to cut a PVDF sheet (or other similar sheet as discussed above) along its main direction. It is well understood that the PVDF has a direction in which the strains will be greater under active excitation, and this direction is the main vibration direction of the absorber and base structure. The second step is to remove, preferably 1 to 2 mm of the silver electrodes on the edge of the PVDF sheet. In the preferred embodiments, acetone is a very good solvent for removing the silver electrodes 15. The third step is to install a connector linked to each electrode 15.

Figure 7:
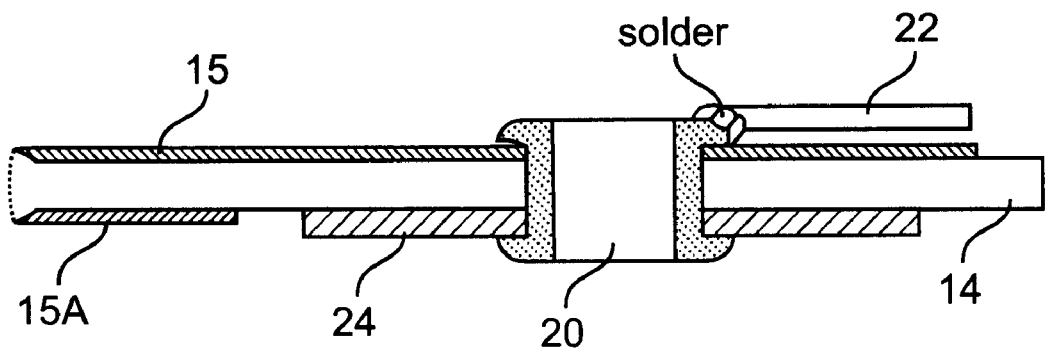
FIG. 7 shows a schematic of a connection to an electrode of the DAVA.

FIG. 7 shows a schematic of a connection to an electrode of the DAVA. Specifically, two areas at one end of the active elastic layer 14 are selected to support a rivet 20. These areas should have an electrode 15 only on one side thereof One electrode 15 is removed for each area so that the rivet 20 will only be in contact with one electrode 15. A hole slightly smaller than the diameter of the rivet 20 is cut in these areas, and a top of each rivet 20 is soldered to a wire 22 so that it can be properly positioned using riveting pliers. In embodiments, an additional piece of plastic 24 can be placed on the backside of the active elastic layer 14 in order to provide a more robust connection. The rivet 20 is then placed in the rivet holes using riveting pliers known in the art. An addition wire (not shown) is connected to the other electrode 15a and the two wires are then soldered to an electrical connector. The precision with which this connection is built is critical, since very high voltages can drive the PVDF active part of the DAVA.

Figure 8:
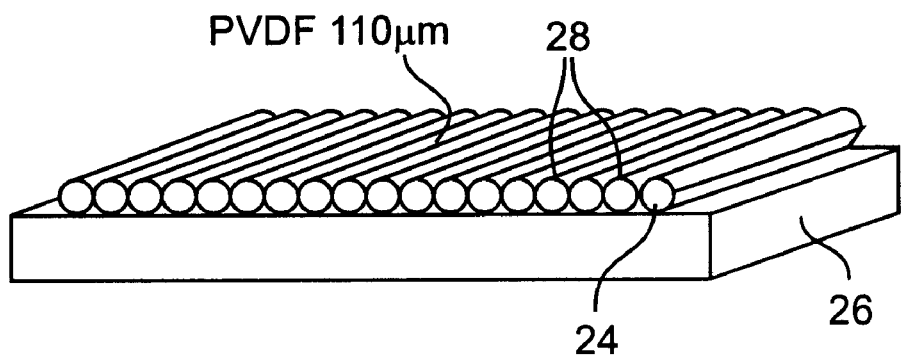
FIG. 8 shows the process for fabricating the active elastic layer of FIGS. 1 and 6.

FIG. 8 further shows the process for fabricating the active elastic layer of FIGS. 1 and 6. First, calibrated steel pins 24 are glued with epoxy on a beam 26. The distance between each pin is preferably 5 mm; however, other distances may be equally used depending on the particular application of the DAVA and the desired distances between adjacent corrugations. The active elastic layer 14 is applied with another set of pins 28 which are positioned in-between the glued steel pins 24. In order to retain its shape, the active elastic layer 14 is kept between the pins 28 for a certain time period, and preferably approximately 3 to 5 days.

Figure 9:
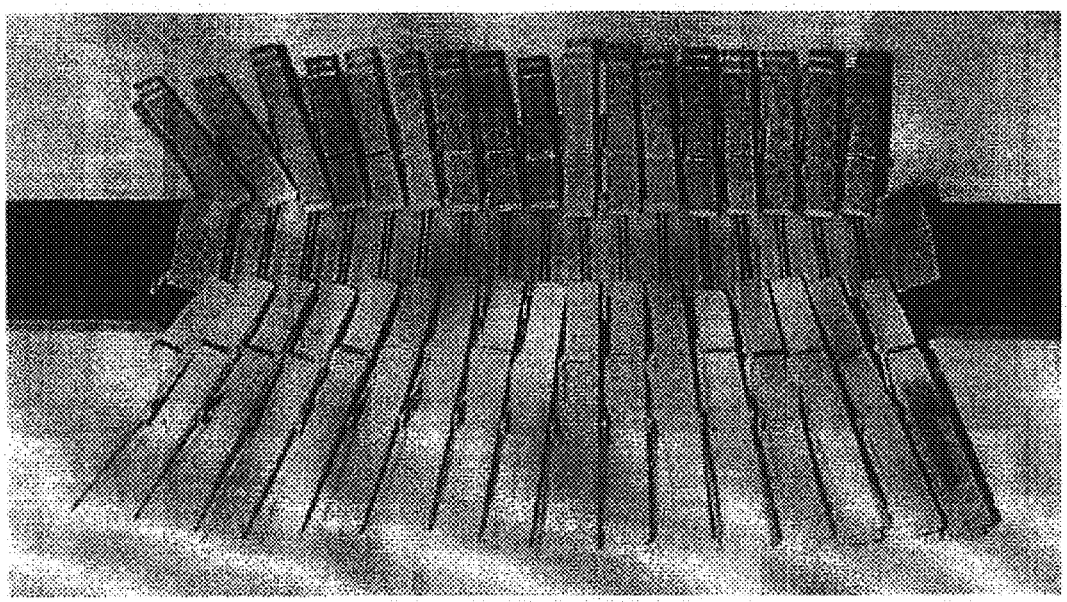
FIG. 9 shows the process for fabricating the active elastic layer of FIGS. 1 and 6.

The additional pins 28 must be kept in place by some artificial mean such as clips or other fasteners, as seen in FIG. 9. The uniformity of the waves of the corrugated form of the active elastic layer 14 is provided at this stage. It is noted, however, that other corrugated forms or other wave shapes may also be provided, and that a slight modification of the placement of the pins 24 and 28 may be used to change the pattern of the active elastic layer 14. The process for providing the active elastic layer 14 into its corrugated form can be performed prior to the installation of the connections.

Figure 10:
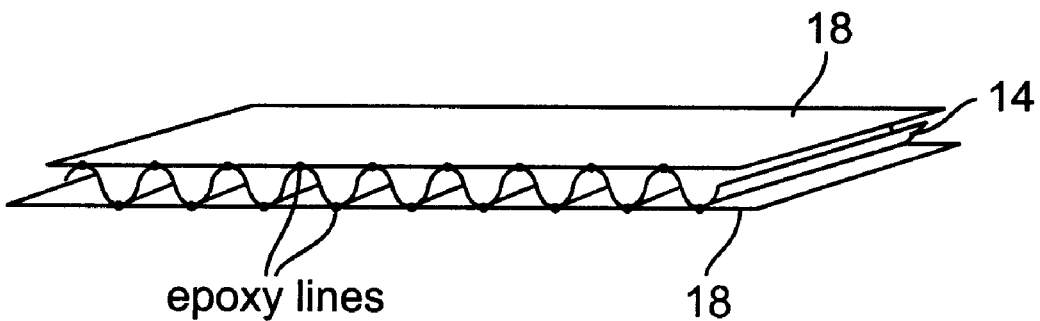
FIG. 10 shows the process for fabricating the active elastic layer of FIGS. 1 and 6.

FIG. 10 shows the plastic sheets 18 being placed on either side of the corrugated active elastic layer 14. In this step, the plastic sheets 18 are glued to the corrugated active elastic layer 14 at epoxy lines 14a, preferably using cyanocrylate glue. These epoxy lines 14a are provided at the uppermost top and bottom portions of each wave of the corrugated active elastic layer 14. The placement of the plastic sheets 18 on either side of the corrugated active elastic layer 14 are used to improve the manufacturing efficiency of the DAVA. The mass layer 16 is then adhered to a top of one of the plastic sheets 18 using preferably cyanocrylate glue. The assembled DAVA is also adhered to the receiving structure 12 with preferably cyanocrylate glue. It is of further import to note that the beam 12 may be grounded by the plastic sheets 18 to ensure that the active elastic layer 14 is not in direct contact with the beam 12. That is, the bottom plastic sheet 18 is used to electrically isolate the active elastic layer 14 from the beam 12 in order to prevent short-circuits.

Experimental Set-up

The DAVA can be excited using its active behavior in order to check its dynamic properties. Accordingly, an experiment was developed to validate the active part of the DAVA and at the same time examine its absorber resonant behavior.

Figure 11:
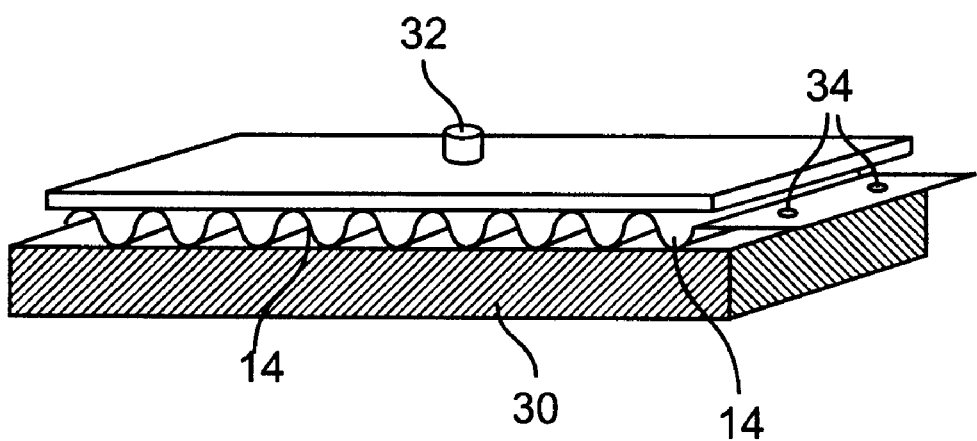
FIG. 11 shows an experimental setup for testing the performance of the DAVA.

FIG. 11 shows an experimental setup to test the performance of the DAVA. In this experimental set up, the base of the DAVA is "clamped" to a bench 30 and an accelerometer 32 is placed on a top of the DAVA. The accelerometer measures the mass vibration, and the active input at contacts 34 is white noise at 100 Vrms.

FIGS. 12a and 12b represent the frequency response of a mass layer in respect to the active input of FIG. 11. The measurements were taken from 100 to 1600 Hz and line 38 represents an experimental and line 39 represents a theoretical distribution. The response shows a peak in acceleration amplitude and a 180° phase shift. The behavior of the DAVA is similar to a single degree of freedom model; however, the DAVA is not a perfect one degree of freedom system (e.g., the stiffness of the DAVA may not be uniform), and it appears from FIGS. 12a and 12b that at around 1300 Hz another resonance begins (which is due to the manufacturing of the active elastic layer 14). As seen in FIGS. 12a and 12b, the resonance frequency of the DAVA is not unique all over the entire DAVA and the transfer function looks slightly different than for a classical point absorber.

Figure 13:
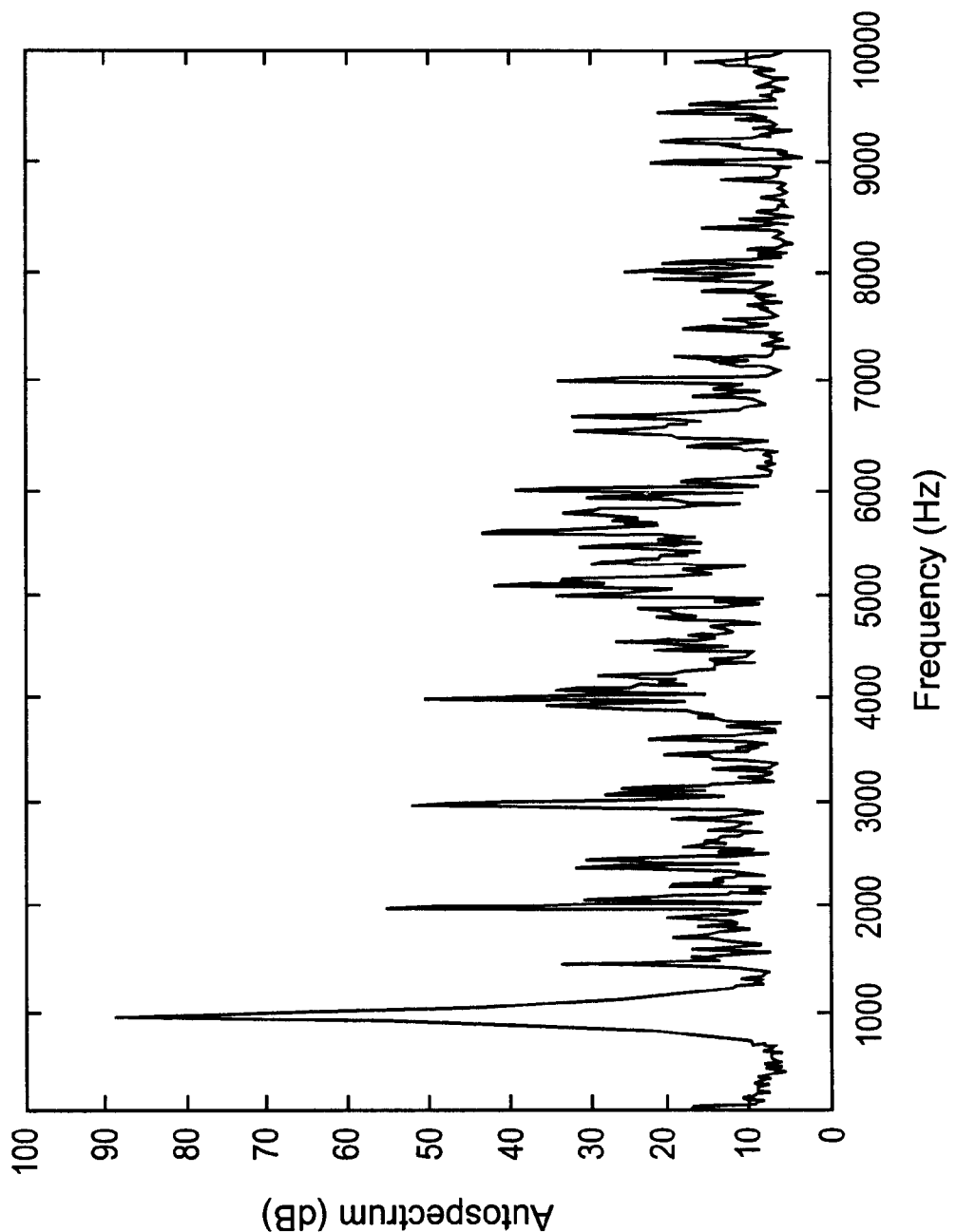
FIG. 13 shows a autospectrum of the signal from an accelerometer of FIG. 11.

FIG. 13 shows an autospectrum of the signal from the accelerometer 32 of FIG. 11. More specifically, the DAVA is excited at a single frequency near its resonance frequency (1000 Hz) in order to maximize the displacements. The voltage used was 200V. An ideally linear device should have around a 60 dB reduction between the fundamental resonant frequency and the first harmonic. However, for the DAVA, the first harmonic is more than 30 dB below the fundamental. On an oscilloscope, the accelerometer signal looks like a perfect sinusoid such that the DAVA of the present invention can be thus considered a linear device.

The design of the DAVA presented herein is suited to a particular structure used for experimental validations. Thus, it is well understood that other structural dimensions using the inventive concepts described herein may be equally used with the present invention, such as, for example, two dimensional areas like plates and panels. By way of further example, thinner PVDF film and thinner mass layers may be used to improve the performance of the DAVA and, at the same time, reduce its size and resonant frequency.

Experiment with Passive Absorbers and Theoretical Comparison

Experiments were performed on the DAVA of the present invention to determine the absorbing properties thereof These experiments were performed with one sized and shaped DAVA utilizing the concepts described above. Thus, these specific experimental results are limited to the DAVA used during the experiment described herein; however, it is well understood that other sized and shaped DAVAs will work equally well using the inventive concepts described herein, and that further results may be obtained.

The experiments were performed on a simply supported beam. The beam was positioned on a heavy bench (20 Kg)

with perpendicular thin sheets of aluminum for the approximation of simply supported boundary conditions. The excitation was performed using anti-symmetric (on each side of the beam) piezoelectric patches. Wood baffles arranged in the plane of the beam allowed the measurement of radiated sound in an anechoic chamber. Reflective tape was added to the beam in order to measure normal beam velocities with a laser velocimeter.

Figure 14:
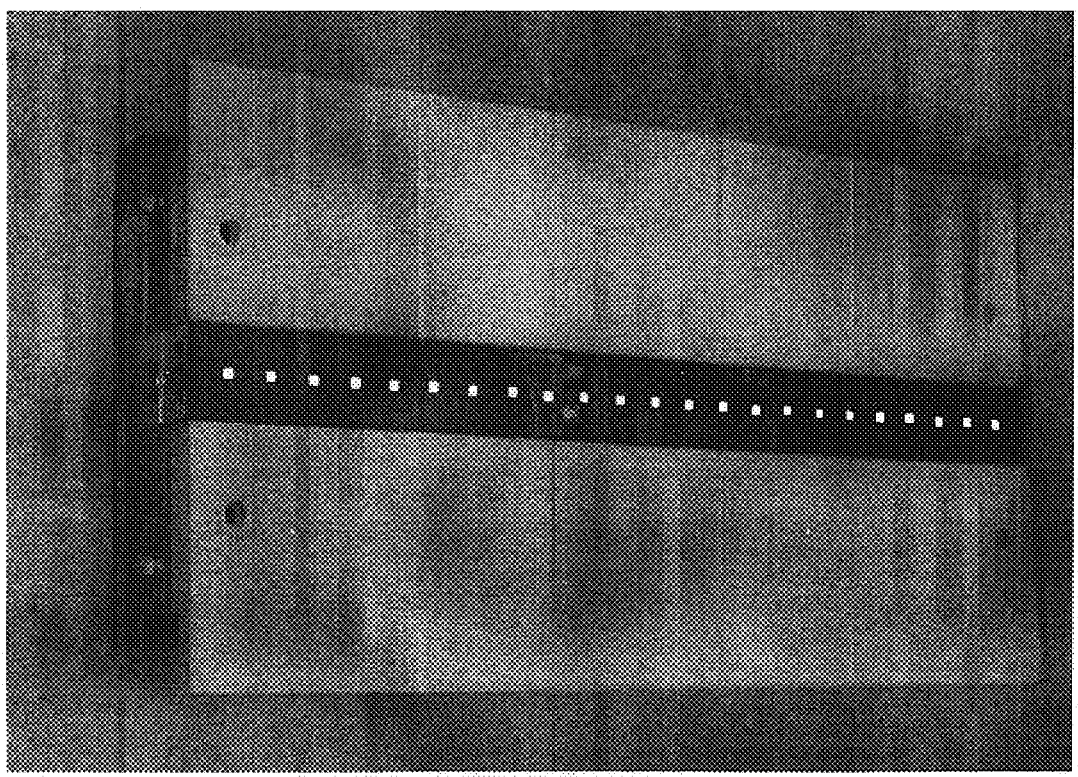
FIG. 14 shows an experimental beam set up with baffles for testing the performance of the DAVA.

FIG. 14 shows an experimental beam set up with baffles used with the present invention and as described above, and FIG. 14a shows a comparison between the DAVA and a point absorber 100. The main length of the beam is 61 cm (24"), and the DAVA was positioned on the other side of the beam as can be seen FIG. 15. The absorber covers ¼ of the length of the beam and is placed next to one end covering half the wavelength of the beam mode.

Figure 14A:
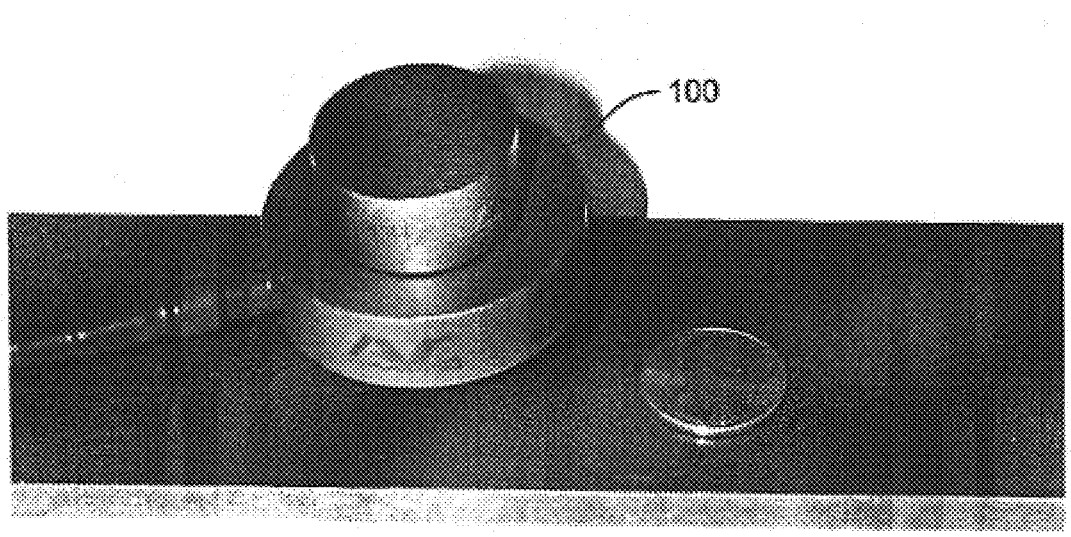
FIG. 14a shows a comparison chart between the DAVA and a point absorber.

The behavior of the DAVA was compared to the point absorber shown in FIG. 14a. The point absorber was positioned in the center of the area taken by the distributed absorber (without the DAVA in place). The weight of each type of absorber is 100 g, which represents only 4% of the beam weight. The experimental measurements and simulations were performed for this same setup. The experiments shows that a point absorber controls one frequency at one point; however, the DAVA of the present invention is a distributed system which is conformed over an extended area of the vibrating structure and which controls various frequencies over such extended area.

Figure 15:
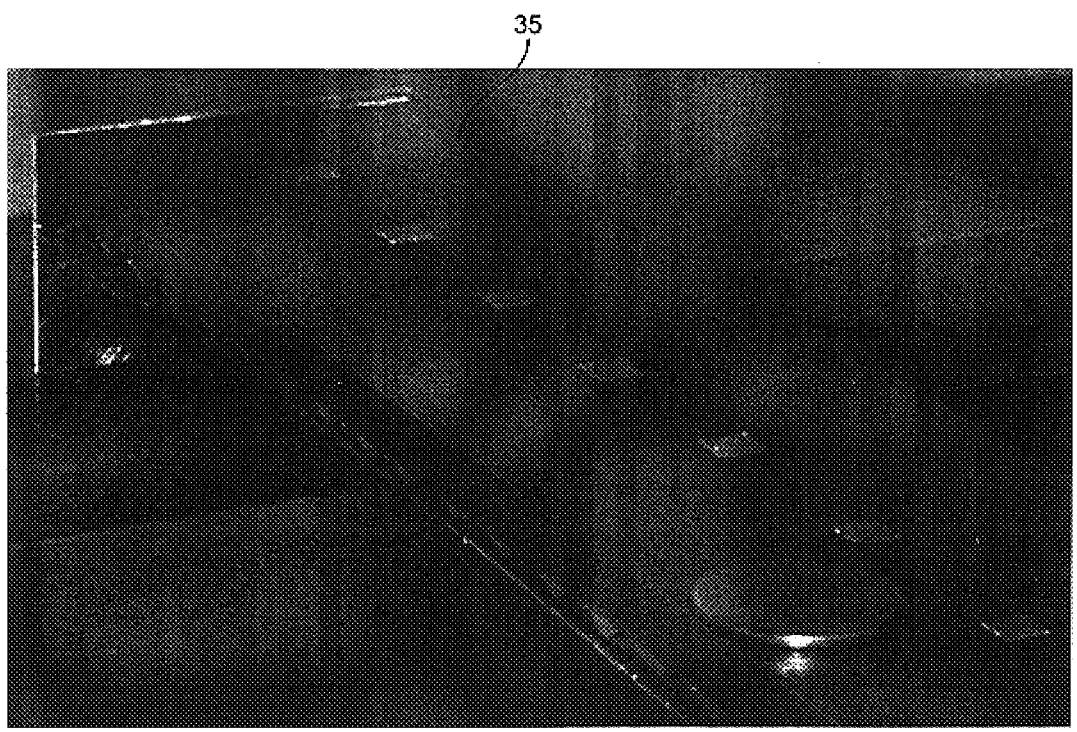
FIG. 15 shows an experimental beam set up without baffles for testing the performance of the DAVA.

The corrugated active elastic layer 14 of the DAVA can be seen on FIG. 15. A one cent coin gives the scale of the picture. FIG. 15 further shows an aluminum sheet 35 used for the simply supported boundary condition at the end of the beam 12.

Figure 16:
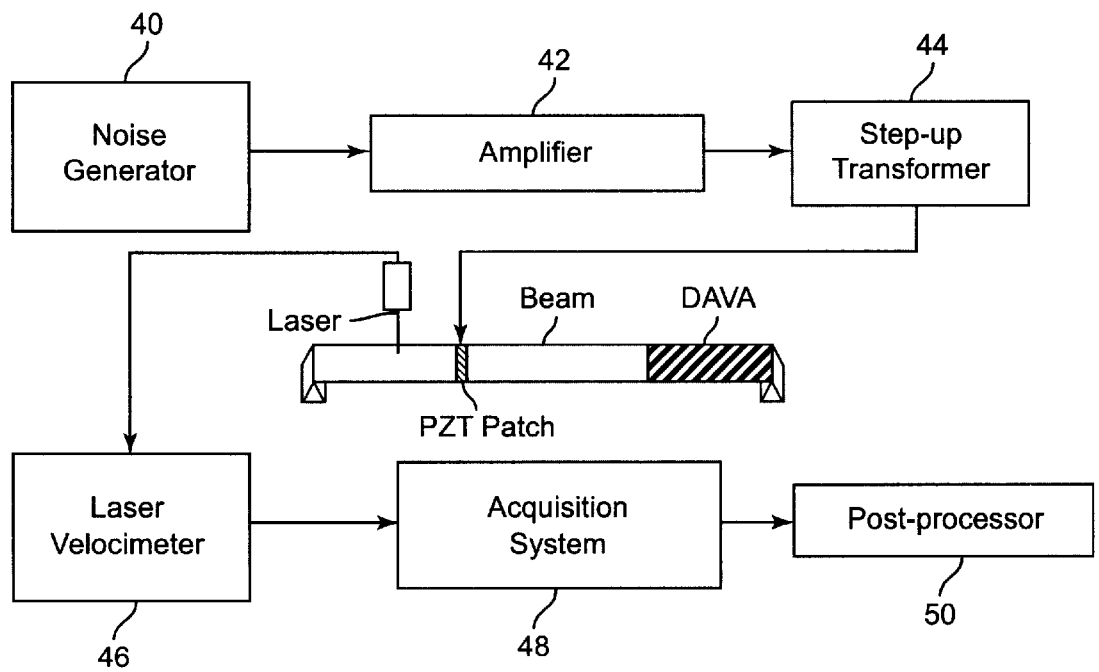
FIG. 16 shows the experimental setup used to measure the performance of the DAVA compared to a point absorber.

FIG. 16 shows the experimental setup used to measure the performance of the DAVA compared to a point absorber. This same experiment is also aimed at tuning and validating the simulation. A noise generator 40 provides a white noise signal of frequency band of 0 to 1600 Hz. This signal is then amplified at amplifier 42 and passed through a voltage step-up transformer 44. The output of the transformer 44 is used to drive the PZT which then actuates the simply supported beam shown FIG. 14. A laser velocimeter 46 measures the normal velocity along the beam, and its output is acquired by a data acquisition system 48 (e.g., a personal computer, acquisition card and associated software). A personal computer 50 is then used to post-process the data.

Figure 17:
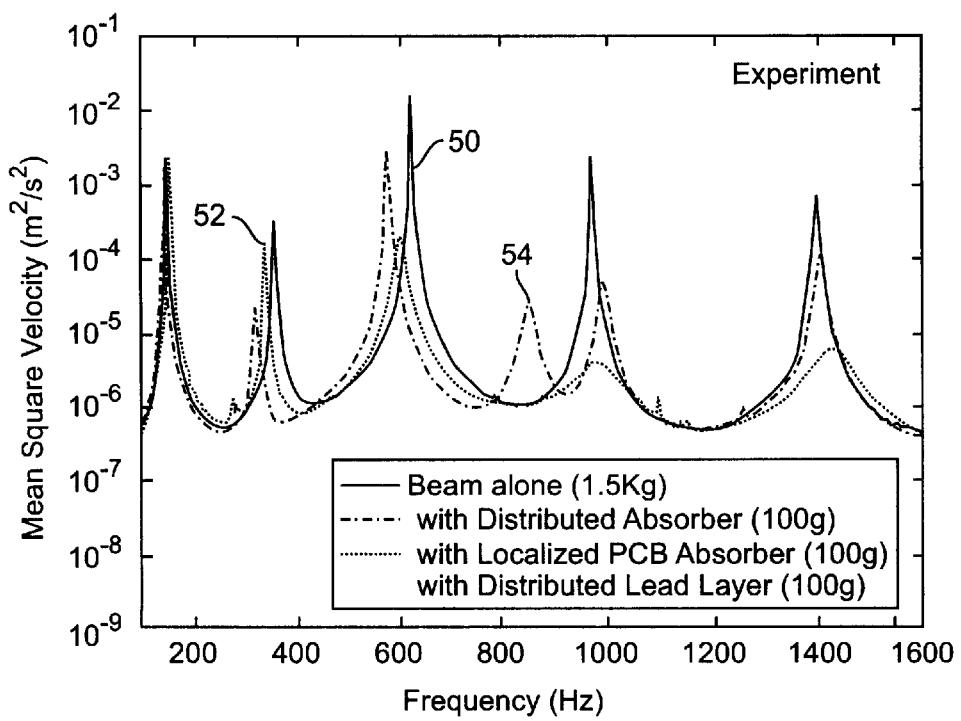
FIG. 17 shows the results of FIG. 16 with a 6" distributed absorber.

From this data, the results of FIG. 17 are obtained. That is, FIG. 17 represents the mean square velocity of the beam. This data can be associated to the average kinetic energy of the beam, and is computed by summing the squared velocities of every point and by dividing by the number of points (e.g., 23). The mean square velocity is normalized per volt of excitation, and is presented from 100 Hz to 1600 Hz. This frequency band does not include the first mode of the beam, which is at 40 Hz. All of the lines of FIG. 17 show vibration control systems having the same mass.(e.g., local and distributed absorbers have 100 g).

Referring still to FIG. 17, line 50 represents the measurement of the beam alone such that the second to the sixth mode of the beam can be observed in order. The line 52 represents the behavior of the beam with a 100 g point absorber. The resonance frequency of this absorber is 850 Hz, and will have an effect on the fifth mode. This mode is split in two resonances with smaller peak values. With a better tuning (resonance frequency of the absorber at 1000 Hz) these peak values would be slightly moved to the right of the axis and centered around 1000 Hz. The line 54 represents the behavior of the beam with the DAVA. In this experiment, the DAVA is used as a passive device. The attenuation provided by the DAVA can be seen to be different from the point absorber. At exactly 1000 Hz, the performance is not as good as a perfectly tuned absorber, as shown in the simulation set up of FIG. 18. The lines 50, 52, 54 of FIG. 17 are the same as lines 50, 52, 54 of FIG. 18. The DAVA does not split the fifth mode and the peak value is much smaller than the peaks appearing with the use of a point absorber. However, some significant reduction is also achieved for the third, fourth and sixth mode. Note that the point absorber achieves very small reduction in comparison. The added mass demonstrates only a slight change in the resonance frequencies and adds only a little damping. As can then be seen, the DAVA works by using a dynamic effect (reactive force) to control the beam vibration similar in concept to the point absorber, but over a distributed area.

Figure 18:
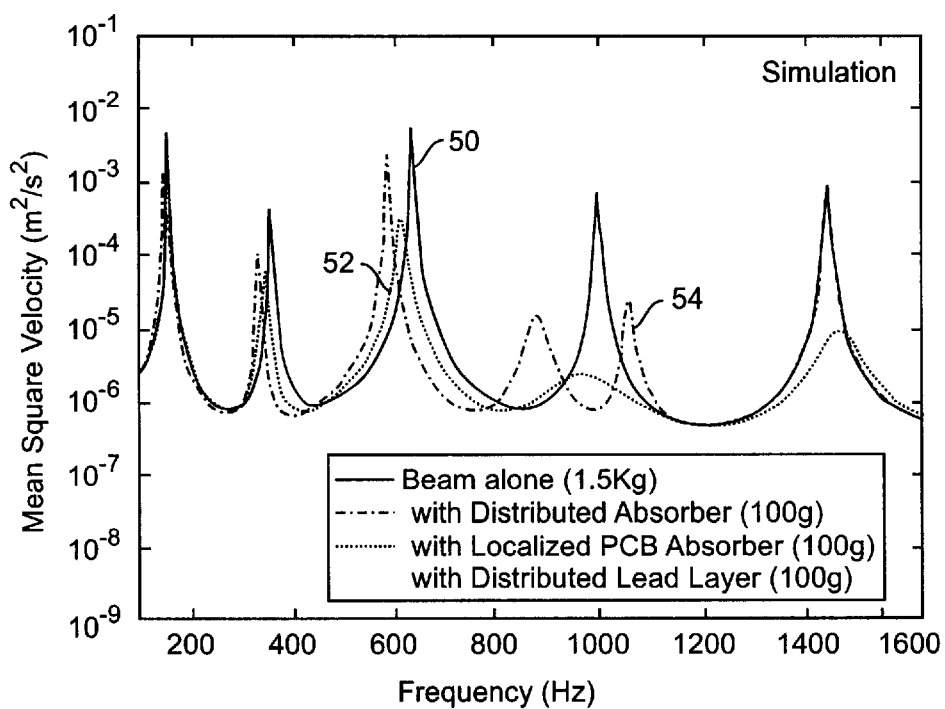
FIG. 18 shows a graph representative of the results of the simulation set up of FIG. 11.

The simulation of FIGS. 17 and 18 show even more clearly the difference between the two types of absorbers, e.g., point absorber and the DAVA of the present invention. For example, the point absorber is very efficient at reducing the response at a single frequency and at a single point on the vibrating structure. The energy is just moved to different frequency bands and two new resonance are created. However, the DAVA does not have this drawback, and the mean squared vibration energy of the beam is diminished for all the resonance frequencies of the beam and there is no new appearance of resonance. Thus, the DAVA is potentially able to control several modes at a time at different frequencies. This property might be extremely useful for the damping of modally dense structures such as plates.

Experiment with Active Absorber

Figure 19:
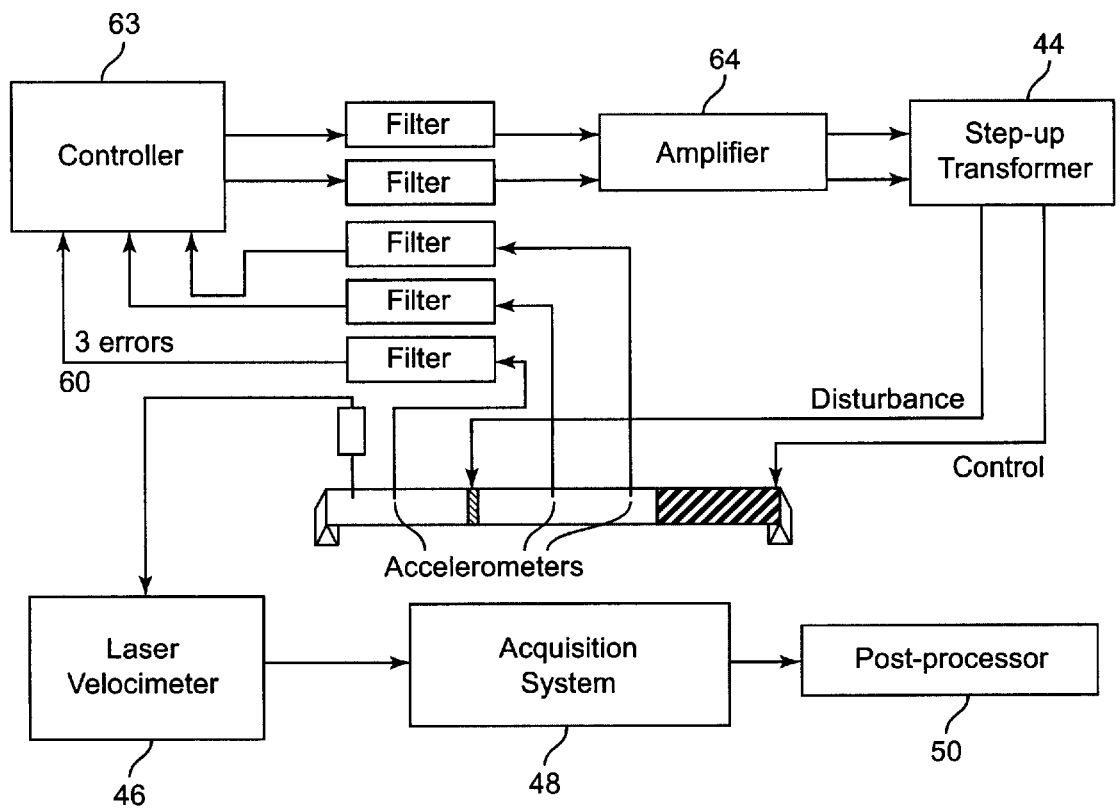
FIG. 19 shows an active control experiment performed using the DAVA of the present invention.

FIG. 19 shows an active control experiment performed using the DAVA of the present invention. The control system employs three accelerometers 60 as error sensors, pass-band filters 64, and a feed forward LMS controller 62 (implemented on a C40 DSP board). The vibration measurements are again performed with the laser velocimeter 46. The disturbance is again white noise generated by the same DSP used to implement the controller 62. The controller 62 attempts to minimize the error sensor signals by controlling the beam with the active part of the DAVA. All the inputs and outputs of the controller are filtered with band pass filters 64. The control algorithm is the LMS algorithm which is well known in the field of vibration control and which optimizes a set of N adaptive filters in order to minimize an error signal knowing a set of inputs. The algorithm can be used to model a linear system. A gradient method is used to find the optimum weight to be associated with the N past values of the system inputs. The error signal used for the gradient search is the difference between the real output of the system and the output of the adaptive filter.

Figure 20:
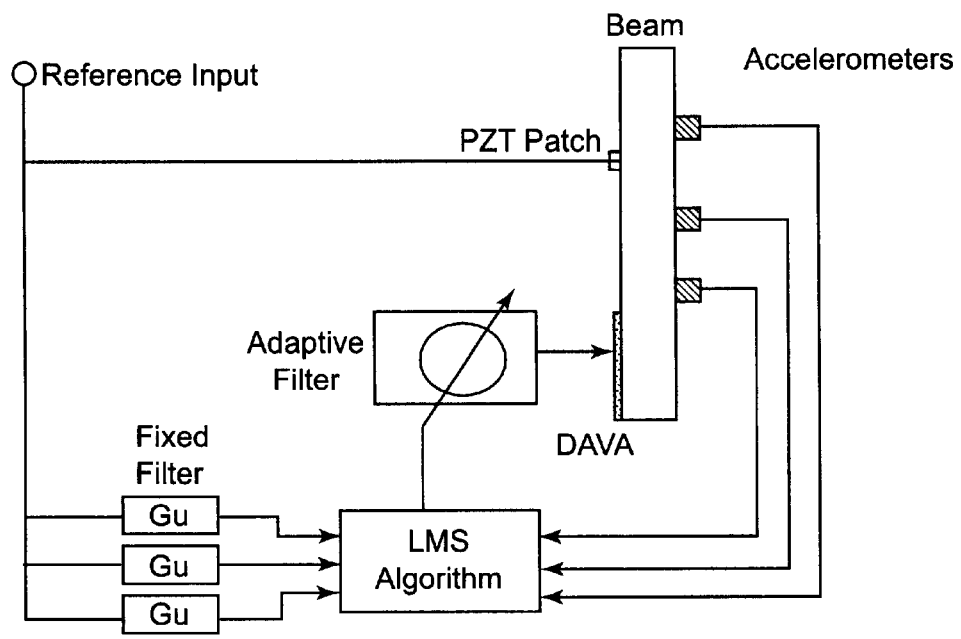
FIG. 20 shows a layout of a controller and test rig used with the present invention.

FIG. 20 shows a layout of a controller and test rig to test the performance of the DAVA. In this experiment, the disturbance signal is also used as the reference signal and has to be filtered by estimate of the transfer function between the DAVA and each error sensor (accelerometers) 60 of FIG. 19. These transfer functions are obtained by system identification using the LMS algorithm, and the controller software minimizes the vibration at the error sensor locations using the active input on the DAVA. The different parameters for this active control experiment are presented in Table 1.

TABLE 1

Parameters for Active Control

| | |
|---|---|
| Error Sensors | 3 |
| Active Absorbers | 1 |
| Disturbances | PZT Patch |
| Reference | Internal |
| Sampling Frequency | 5000 Hz |
| System ID filter coefficients | 120 |
| Control Path Filter Coefficients | 180 |

The error sensors 60 were respectively positioned at −7.5", −1.5", and 5.5" from the center of the beam. Vibration measurements were performed using the laser velocimeter every inch of the beam (e.g., 23 points overall). The mean square velocity computed and is presented in FIG. 21.

Figure 21:
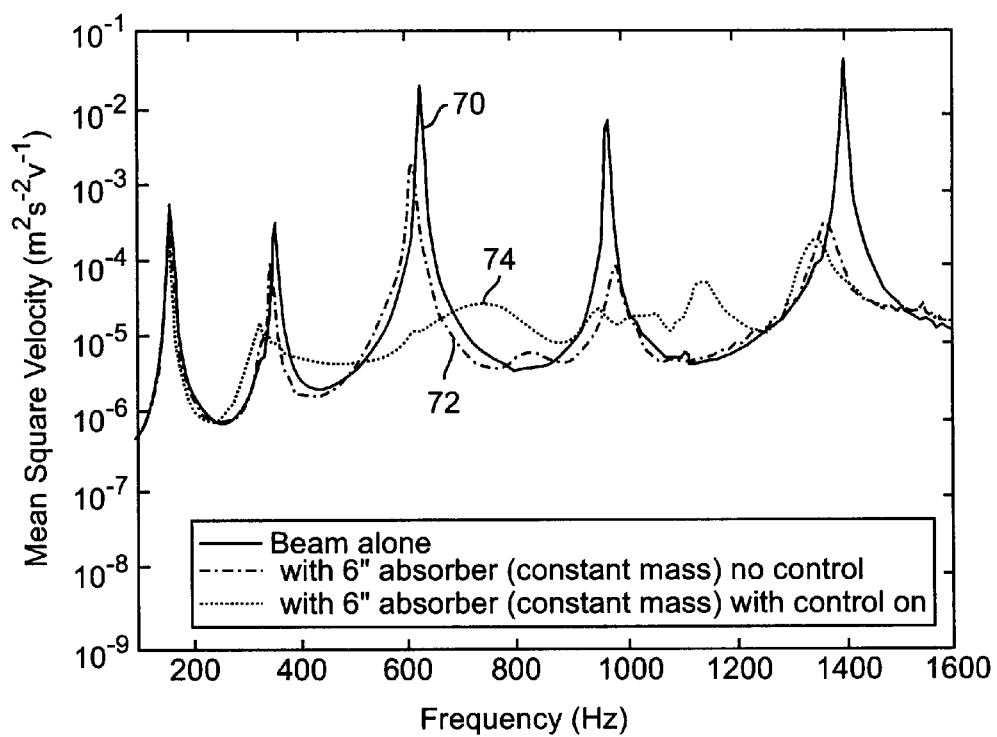
FIG. 21 shows an active control experiment with a constant mass distribution DAVA.

Specifically, FIG. 21 shows the active control experiment with the DAVA of the present invention (constant mass distribution). The line 70 represents the behavior of the beam with the DAVA acting as a passive device. The reduction in mean square velocity obtained in this passive configuration is 10 dB for the frequency band of 100–1600 Hz. With the active control on, FIG. 21 demonstrates that an additional 3dB is obtained. The behavior of the beam controlled actively by the DAVA is presented by the line 74. The performance of the active system is very good at reducing the resonance peaks, for example, a 20 dB reduction is obtained at 600 Hz which is the most important peak before control. In between resonances, the active control increases the vibration (termed control spillover), which can be easily corrected by using a better controller and more error sensors. With the active control on, the structure has a non-resonant behavior, and the DAVA adds a significant damping to the system. No active control is obtained below 400 Hz due to the response of the PVDF and of the absorber itself

Optimization of the DAVA of the Present Invention

In order to increase the efficiency of the DAVA, the mass distribution is optimized. That is, in order to provide an increased attenuation, the mass layer 16 will preferably vary along the length of the entire or large area of the beam. The varying mass distribution will alter the local properties of the DAVA to ideally match the locally varying response properties of the base structure. However, because the beam/DAVA response is complicated along the beam it is necessary to derive an optimal process for choosing the mass distribution.

In order to provide the optimal process for the choosing the mass distribution, a genetic algorithm was chosen to provide a solution to this problem. (It is also necessary to know the dynamic properties of the structure to be controlled.) This algorithm is described in detail in "A Distributed Active Vibration Absorber (DAVA) for Active-Passive Vibration and Sound Radiation Control", P. E. Cambou, Sep. 7, 1998, and is incorporated herein by reference in its entirety. However, other known optimization procedures may also be used, for example, non-linear optimization, subset election, neural networks and other well known methods. The parameters used for the optimization process are provided in table 2.

TABLE 2

Optimization Process

| | |
|---|---|
| Starting Generation | 10 First Psin |
| Number of Generation | 46 |
| Number of Individual per Generation | 10 |
| Number of Bit per Chromosome | 45 |
| Fitness | 1/(Radiated Power) |
| Rate of Mutation | 0.03 |

For these example results, the DAVA is optimized to minimize the total radiated power of the beam when active control is on over a frequency band of 800 to 1200 Hz. Other performance goals could be chosen if needed.

For the optimization task, the total mass of the mass layer 16 was kept constant (100 g) and its thickness varied over its length. The example solution is a mass distribution from a set of possible solutions that performs well; however, it is well understood that other solutions can also be achieved and that the solutions provided herein are for illustrative purposes and that the present invention is not limited to the solutions provided herein.

Figure 22:
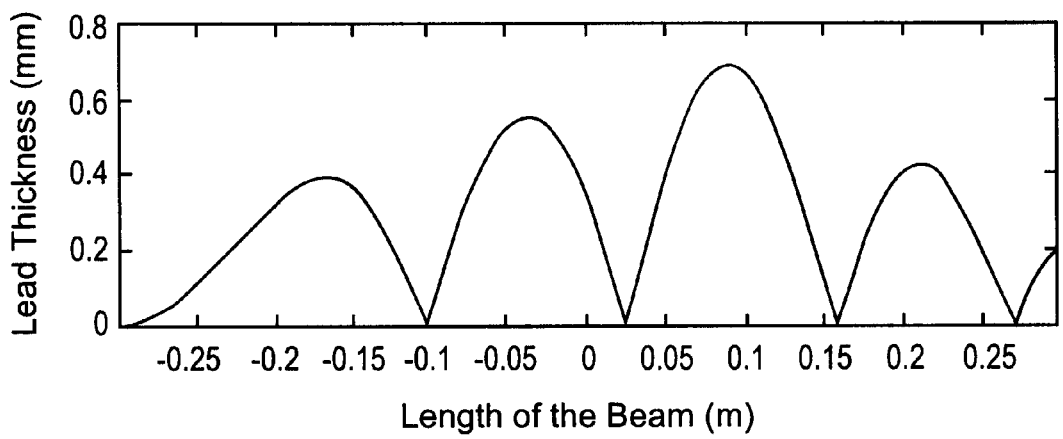
FIG. 22 shows the mass distribution optimized for the radiated power of 800–1200 Hz.

FIG. 22 shows the mass distribution optimized for the radiated power of 800–1200 Hz. This mass distribution is the absolute value of a optimization objective function that may be negative. In the particular distribution of FIG. 22, each alternate lobe is negative. A part of the DAVA with a "negative mass" means that the motion is in the other direction (180° out-of-phase) compared to the parts with "positive mass". For this reason, in the preferred embodiment, the parts associated with a "negative mass" are wired in opposition to the ones with "positive mass". It is noted that in the preferred embodiment the optimized mass is the same total weight as a constant mass, but the mass is redistributed.

The mass distribution is described with the nine first Psin functions and the coefficients associated with each of these functions are presented in table 3.

TABLE 3

Order of Psin Functions

| | Psin function | | | | | | | | |
|---|---|---|---|---|---|---|---|---|---|
| | 1 | 2 | 3 | 4 | 5 | 6 | 7 | 8 | 9 |
| Coeff. | 0 | .2 | .333 | .8 | .333 | .067 | .067 | .933 | −0.6 |

As seen in Table 3, the number of functions used is very small, and it is well understood that more functions may result in a better solution. The advantage of having few coefficients is that the distribution will be relatively simple and therefore easily manufactured.

Experimental Investigation

The DAVA of the present invention having a distributed mass is preferably divided into four sections, where each section is wired with the opposite phase of its neighbors for the reasons discussed above. These sections (including, in embodiments the corresponding active elastic layer) may also be equally controlled separately and independently for in phase and out phase thereby creating multi-channel control. Several thin sheets of lead (0.1 mm) are stacked on top of each other and are used to approximate the optimal mass distribution curve of FIG. 22. The optimized mass may equally be machined or cast.

Figure 23:
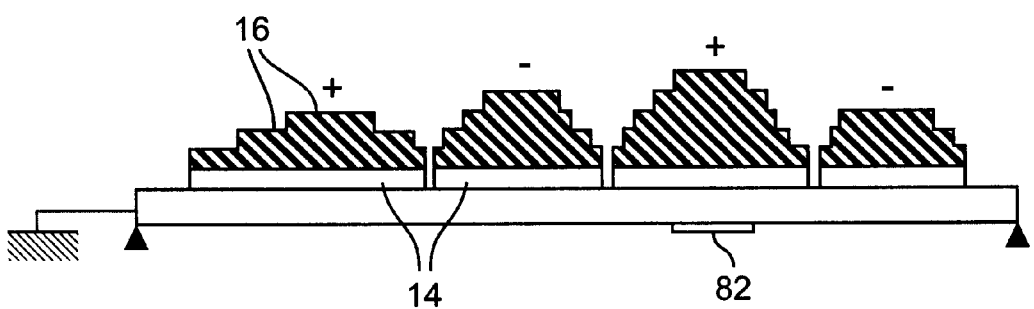
FIG. 23 shows the DAVA with optimally varying mass distribution.

FIG. 23 shows the DAVA with optimally varying mass distribution. The sign on top of each part of the DAVA refers to the polarity of the elastic PVDF sheet 14 in respect to the piezoelectric drive patch (the disturbance). It is noted that the beam response used in the optimization procedure is strongly dependent upon the disturbance location, and that the maximum reactive dynamic effect of the DAVA occurs in direct opposition to the disturbance. As seen in FIG. 22, the thickness of the mass layer 16 is varied, while the mass remains constant.

Figure 24:
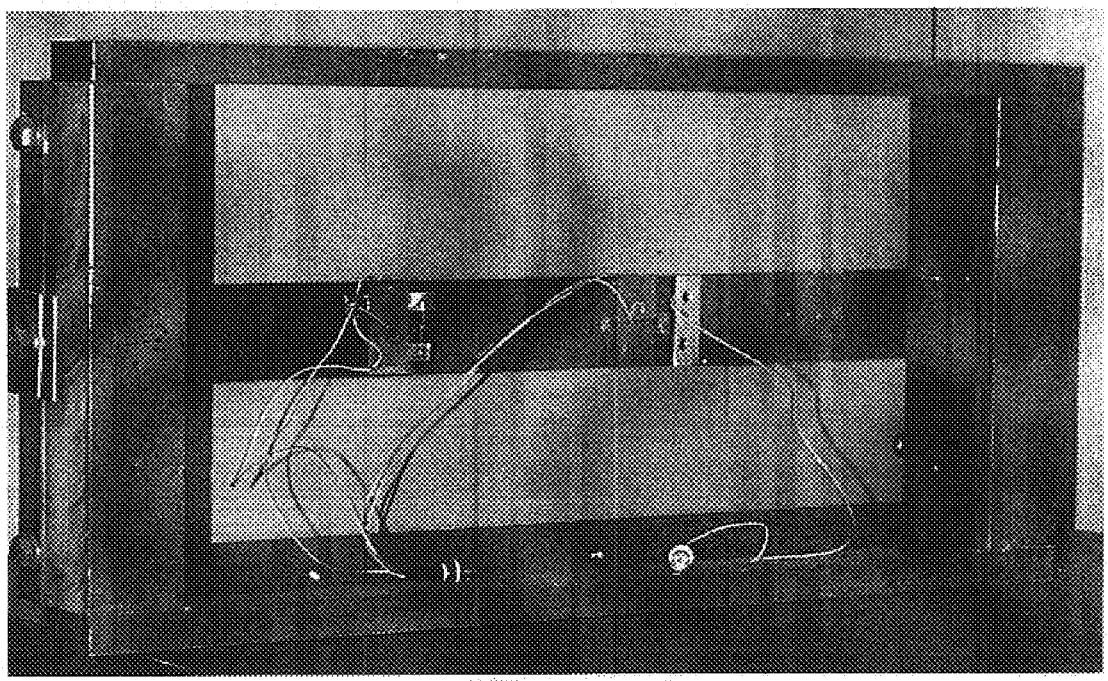
FIG. 24 shows the DAVA with an optimal mass distribution.

FIG. 24 shows the DAVA with an optimal mass distribution. The four parts of the absorber of FIG. 23 are seen to be connected to a single connector, and is thus considered a single actuator. Note that the experimental controller is designed to minimize vibration at three accelerometer locations, and not radiated power as in the optimization process. However radiation is directly related to the beam response and thus the experimental results are likely to be satisfactory (as will be seen).

Figure 25:
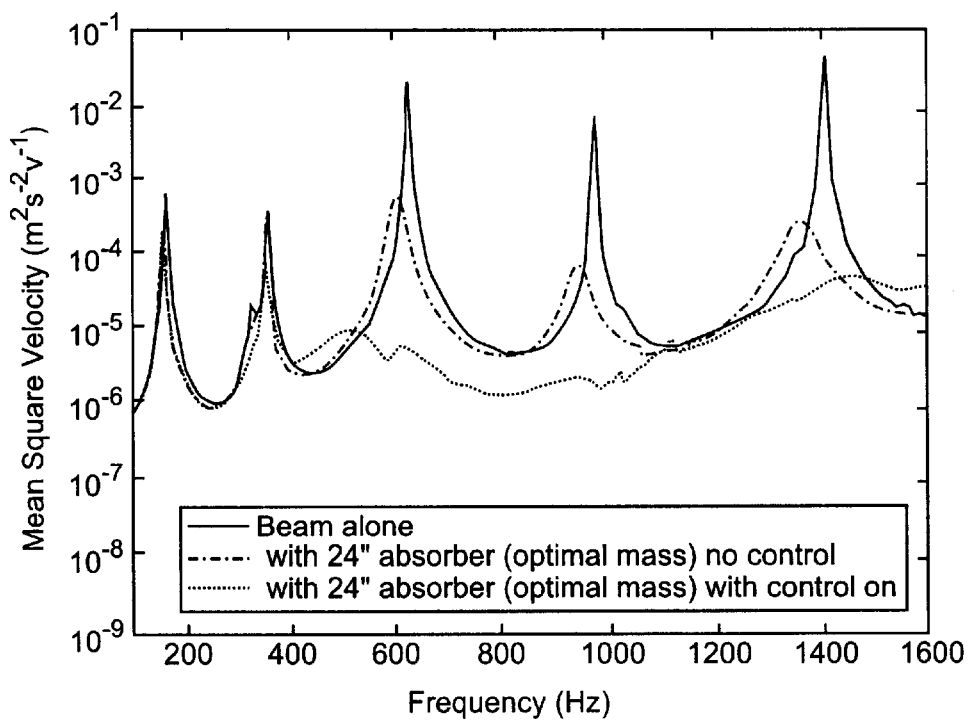
FIG. 25 shows a graph of the active control experiment with an optimal mass.

FIG. 25 shows a graph of the active control experiment with an optimal mass of the DAVA. FIGS. 21 and 25 can be compared to show the differences between the DAVA with a constant mass distribution and the DAVA with optimal mass distribution. The DAVA with an optimal mass distribution is seen to perform better than one with constant mass; however, both the DAVA with an optimal mass distribution and the DAVA with constant mass provide improved results over a point absorber and the like.

Referring still to FIG. 25, as a passive device (no control), a 13 dB reduction is obtained for the frequency band of 100–1600 Hz. With the active control on, the results are significantly better and, in fact, an additional 6 dB reduction is obtained over the same frequency band. The control is not efficient under 400 Hz and above 1400 Hz since the DAVA of the illustrative example provided herein does not have much active control authority on the beam at frequencies far from its main resonance, and was further optimized for the 800 to 1200 Hz band. However, the DAVA of the present invention may be implemented and optimized in the 800 to 1200 Hz band under proper active control authority for the range of 800 to 1200 Hz band, which is easily obtained by one of ordinary skill in the art of vibration control.

The shape of the DAVA and its lowest resonance frequency, which is around 1200 Hz, limits its active actuation ability at very low frequencies. However the very good active performance of the distributed distribution validates the genetic search, and also demonstrates the power of the simulation and the optimization tool to enhance the particular design.

Table 4 below shows the reduction obtained with the different devices investigated.

TABLE 4

Reduction Obtained with the Different Devices

| | |
|---|---|
| 24" Constrained layer | 7 dB |
| 6" Distributed absorber with constant mass distribution | 10 dB |
| 6" Distributed absorber with constant mass distribution with active control | 13 dB |
| 24" Distributed absorber with optimal mass distribution | 13 dB |
| 24" Distributed absorber with optimal mass distribution with active control on | 19 dB |

As seen from Table 4, the mass distribution appears to be one of the critical parts of the DAVA and, in preferred embodiments, needs to be optimized. The classical approach that takes only into account the resonance frequency of the absorber for the tuning is not appropriate in this case, and a thinner mass layer 16 distributed along the beam is more efficient than a thick one covering ¼ of the length thereof The second reason in distributing and optimizing the mass is the active control performance since an optimal mass distribution can significantly reduce the vibration level (6 dB) with active control on. It is further noted that with an optimal mass distribution, the active control significantly improves the performance of the DAVA.

Figure 26:
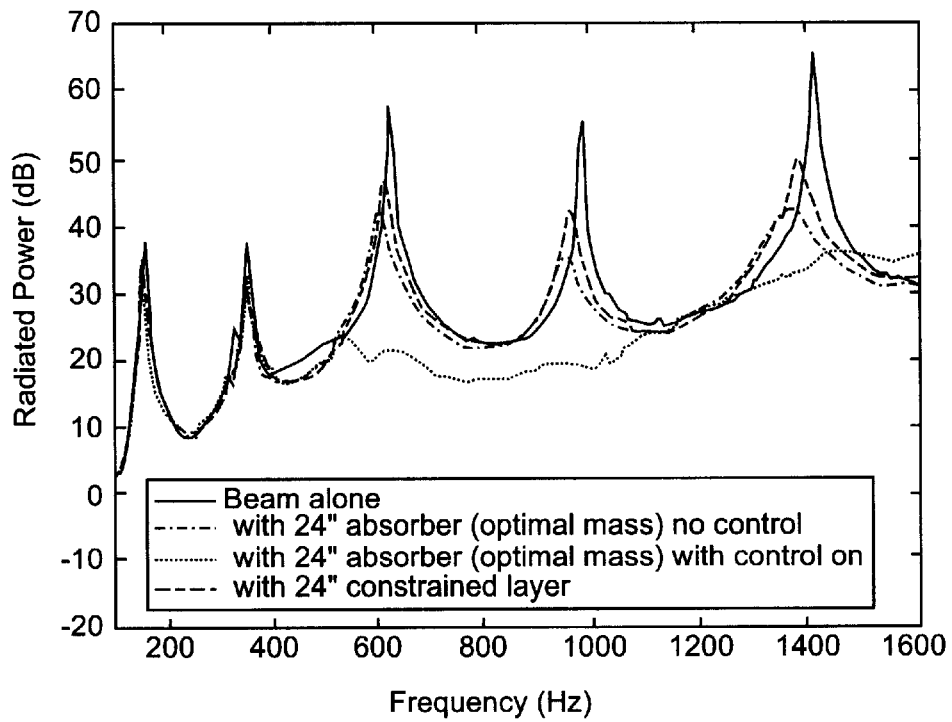
FIG. 26 shows a graph of a beam with a distributed absorber and constrained layer.

FIG. 26 shows the radiated power of the beam between 100 Hz and 1600 Hz. The mass distribution was numerically optimized for the sound radiation and the structured error sensors may be filtered sensors for the radiated power. This relation exists even if the relationship is extremely complex between the acceleration of the three points of the beam, as discussed above, and the radiated power. It is noted that controlling the three structural points actually reduces the radiated power of the beam. (The sound radiated power is computed from the vibration data using the relations of Appendix A of "A Distributed Active Vibration Absorber (DAVA) for Active-Passive Vibration and Sound Radiation Control", P. E. Cambou, Sep. 7, 1998. This is because the beam does not emit enough sound to be measured in an anechoic chamber.)

As seen in FIG. 26, the DAVA can be seen to perform very well in reducing the radiated power of the beam for the frequency band it was designed, e.g., 800–1200 Hz. The radiated power is also reduced dramatically at the 600 and 1450 Hz resonance peaks. This performance is particular to this experiment since the errors sensors were not designed to reduce the radiated power, but only the vibration of three points of the beam. However, these results still demonstrate the use of the DAVA for reducing sound instead of vibration.

One important final analysis is the comparison between the DAVA of the present invention and a traditional distributed vibration treatment such as a constrained layer damping material. For this purpose an experiment was performed using constrained layer damping material alone, and another data set is added on FIG. 26 concerning a constrained layer. The characteristics of this constrained layer can be seen in Table 5.

TABLE 5

Characteristics of a Constrained Layer

| | |
|---|---|
| Length | 24" |
| Weight | 100 g |
| Thickness of Viscoelastic layer | 1 mm × 2 |
| Thickness of aluminum layer | 0.5 mm |

As seen from Table 5, the weight of the constrained layer was chosen to be identical to the DAVA. The results, shown also in FIG. 26, demonstrate that the DAVA is more efficient than the constrained layer in reducing the resonance behavior of the beam for the considered frequency band. The constrained layer has the advantage of being efficient on a very large bandwidth and especially at high frequency. However, the DAVA of can be targeted at a smaller bandwidth and is more efficient in this chosen bandwidth especially with the active control on. The DAVA concept is therefore competitive compared to the conventional constrained layer damping treatment.

Figure 27:
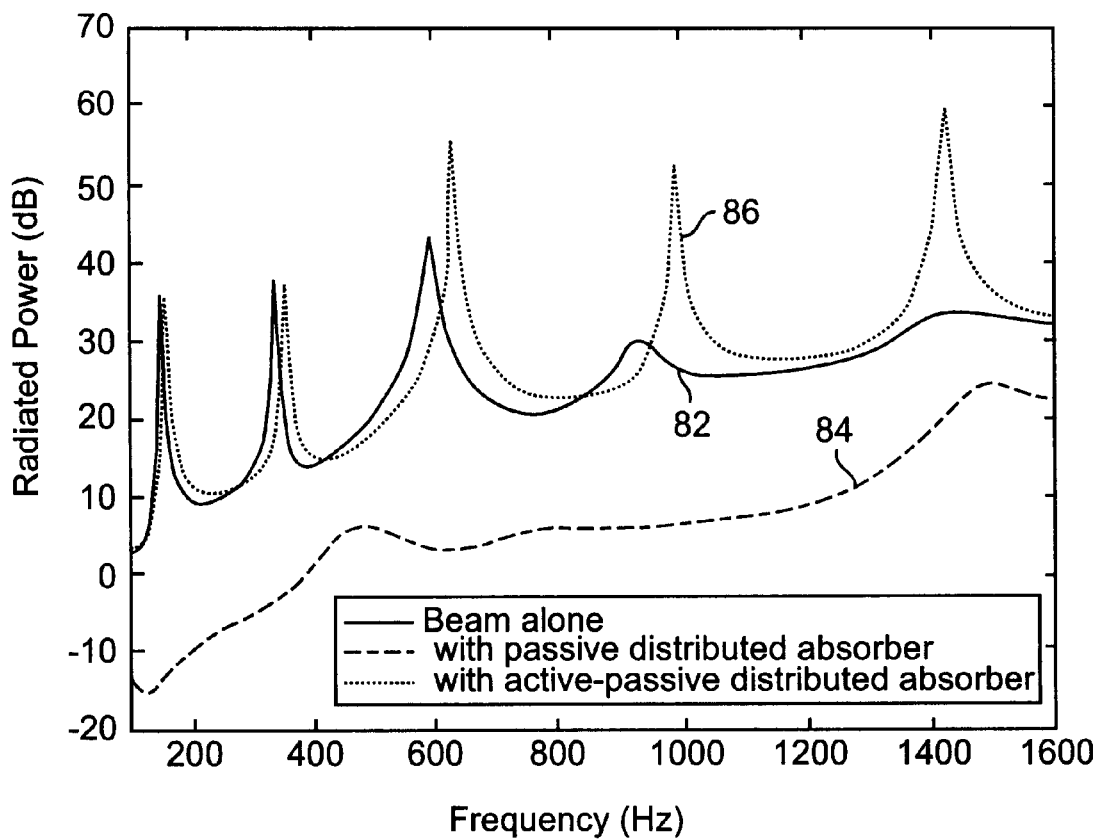
FIG. 27 shows a simulation of an experimental setup using an optimal control.

FIG. 27 shows the simulation of an experimental setup using an optimal control. The line 84 shows the best possible active control solution where no limitation on the control voltage is imposed. The simulation can be seen to be reasonably similar to the experimental data of FIG. 26. As seen herein, the behavior of the DAVA is well modeled except for the peak at 1450 Hz which is due mainly to imperfections of the prototype DAVA used for the simulations herein. The ability of a distributed active vibration absorber according to the present invention to reduce sound and vibration has been now demonstrated.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A distributed active vibration absorber (DAVA) for controlling vibration and sound radiation over an extended area of a vibrating structure, comprising:
an active elastic layer having a waved surface comprised of a plurality of waved portion and a low stiffness per unit area, said active elastic layer being distributed along an area of the vibrating structure; and
a mass layer adhered to an uppermost top portion of each waved portion of the active elastic layer.

2. The DAVA of claim 1, wherein:
the active elastic layer includes a first electrode and a second electrode positioned on a first side and a second side of the active elastic layer, respectively, and
the active elastic layer is electrically activated when a voltage is applied between the first and second electrodes thereby creating an electric field.

3. The DAVA of claim 2, wherein the active elastic layer is a piezoelectric material which mechanically shrinks and expands under an influence of the electric field.

4. The DAVA of claim 2, wherein a distance between two planes on opposing sides of the mass layer change when the active elastic layer mechanically shrinks and expands under the influence of the electric field.

5. The DAVA of claim 2, wherein the active elastic layer moves in a direction perpendicular to its main plane when the voltage is applied between the first and second electrodes.

6. The DAVA of claim 5, wherein the movement of the active elastic layer changes a motion of the mass layer, thereby improving and adjusting the dynamic properties of the DAVA.

7. The DAVA of claim 5, wherein the movement of the active elastic layer is greater under a negative applied voltage than a positive applied voltage.

8. The DAVA of claim 7, wherein the active elastic layer is transformed from an in plane motion into an out of plane motion when the voltage is applied to the active elastic layer.

9. The DAVA of claim 1, wherein:
the mass layer weighs no more than approximately 10% of an overall mass of the vibrating structure, and
the thickness of the mass layer is proportional to a weight per unit area of the vibrating structure.

10. The DAVA of claim 1, wherein the active elastic layer is resistant to crushing and is a corrugated shape.

11. The DAVA of claim 1, further comprising first and second sheets of plastic adhered to first and second sides of the active elastic layer, respectively,
wherein the first and second sheets of plastic prevent axial motion of the active elastic layer, and
wherein the first and second sheets of plastic ground the active elastic layer.

12. The DAVA of claim 11, wherein:
the first and second sheets of plastic are adhered to the first and second sides of the active elastic layer, respectively, by an epoxy,
the mass layer is adhered to the uppermost top portion of each waved portion of the active elastic layer by the epoxy.

13. The DAVA of claim 1, wherein the mass layer is larger in areas where the vibrating structure has modal contributions of a first amplitude compared to where the vibrating structure has modal contributions of a second amplitude, the first amplitude being larger than the second amplitude.

14. The DAVA of claim 13, where the mass of the mass layer decreases from a center of the active elastic layer towards ends of the active elastic layers.

15. The DAVA of claim 1, wherein the mass layer has a constant thickness.

16. The DAVA of claim 1, wherein the mass layer matches locally varying response properties of the vibrating structure along a length of the vibrating structure.

17. The DAVA of claim 1, wherein the active elastic layer and the mass layer decrease a vibration energy of the vibrating structure at substantially all the resonance frequencies of the vibrating structure.

18. The DAVA of claim 1, wherein a total mass of the mass layer is constant and a thickness of the mass layer varies according to modal contributions of the vibrating body.

19. The DAVA of claim 18, wherein the total mass of the mass layer is a distributed mass and is divided into sections, where each section has an opposite phase of an adjacent section.

20. The DAVA of the claim 19, wherein the each section is individually controlled.

21. The DAVA of claim 18, wherein the sections are connected to a single connector thus creating a single actuator.

22. The DAVA of claim 18, wherein the thickness of the mass layer is varied by stacking sheets of a mass material.

23. The DAVA of claim 22, wherein the mass material includes at least lead steel, aluminum or composite fiberglass.

24. The DAVA of claim 1, wherein a stiffness of the DAVA is locally small and globally the stiffness is equal to a point absorber with substantially similar mass.

25. The DAVA of claim 1, wherein an increase in a thickness of the active elastic layer decreases a transversal stiffness of the active elastic layer.

26. The DAVA of claim 1, wherein an increase in wavelength of the active elastic layer decreases a transversal stiffness of the active elastic layer.

27. The DAVA of claim 1, wherein a voltage applied to the active elastic layer changes the stiffness of the active elastic layer.

28. The DAVA of claim 1, wherein the waved surface of the active elastic layer increases an amplitude of motion and decreases a stiffness of the DAVA in order to control vibration and sound radiation of the vibrating body.

29. The DAVA of claim 1, wherein the active elastic layer and the mass layer conform to a surface of the vibrating body.

30. The DAVA of claim 1, further comprising:
at least another active elastic layer; and
at least another the mass layer,
the at least another active elastic layers and the at least another mass layer are alternately stacked, the least another active elastic layer is independently tuned and the at least another mass layer has a predetermined mass distribution, and the least another active elastic layer and the at least another mass layer control multiple frequencies of the vibrating structure over the distributed area of the vibrating structure.

31. The DAVA of claim 1, wherein the active elastic layer is comprised of polyvinylidene fluoride (PVDF), a piezoelectric ceramic, a PZT rubber or an electro mechanical device.

* * * * *

UNITED STATES PATENT AND TRADEMARK OFFICE
CERTIFICATE OF CORRECTION

PATENT NO. : 6,700,304 B1  Page 1 of 1
APPLICATION NO. : 09/294398
DATED : March 2, 2006
INVENTOR(S) : Fuller et al.

It is certified that error appears in the above-identified patent and that said Letters Patent is hereby corrected as shown below:

In column 1 after the title line 4, add the following paragraph:

--This invention was made with government support under Grant No. N00014-94-1-1140 by the Office of Naval Research. The government has certain rights in this invention.--

Signed and Sealed this

Eighth Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 6,700,304 B1
APPLICATION NO. : 09/294398
DATED : March 2, 2004
INVENTOR(S) : Fuller et al.

Page 1 of 1

It is certified that error appears in the above-identified patent and that said Letters Patent is hereby corrected as shown below:

In column 1 after the title line 4, add the following paragraph:

--This invention was made with government support under Grant No. N00014-94-1-1140 by the Office of Naval Research. The government has certain rights in this invention.--

This certificate supersedes Certificate of Correction issued May 8, 2007.

Signed and Sealed this

Tenth Day of July, 2007

JON W. DUDAS
*Director of the United States Patent and Trademark Office*